(12) United States Patent
Iwai et al.

(10) Patent No.: US 6,334,080 B1
(45) Date of Patent: Dec. 25, 2001

(54) VEHICLE CONTROL APPARATUS AND METHOD SHARING CONTROL DATA

(75) Inventors: Akihito Iwai, Chiryu; Hirotaka Yamamoto, Kariya, both of (JP)

(73) Assignee: Denso Corporation, Aichi-pref. (JP)

( * ) Notice: Subject to any disclaimer, the term of this patent is extended or adjusted under 35 U.S.C. 154(b) by 0 days.

(21) Appl. No.: 09/476,206

(22) Filed: Dec. 30, 1999

(30) Foreign Application Priority Data

Feb. 8, 1999 (JP) .................................................. 11-030572

(51) Int. Cl.$^7$ ....................................................... G06F 19/00
(52) U.S. Cl. .................................... 701/48; 701/1; 701/35
(58) Field of Search ................................. 701/48, 1, 35, 701/53, 45, 49

(56) References Cited

U.S. PATENT DOCUMENTS

| | | | | |
|---|---|---|---|---|
| 5,508,929 | * | 4/1996 | Harada | 701/48 |
| 5,826,211 | * | 10/1998 | Kobayashi | 701/115 |
| 5,974,346 | * | 10/1999 | Poledna | 701/1 |
| 6,081,755 | * | 6/2000 | Fujimoto | 701/1 |
| 6,101,428 | * | 8/2000 | Snyder | 701/2 |
| 6,148,253 | * | 11/2000 | Taguchi et al. | 701/48 |
| 6,176,587 | * | 1/2001 | Fredricks | 359/843 |

* cited by examiner

*Primary Examiner*—William A. Cuchlinski, Jr.
*Assistant Examiner*—Olga Hernandez
(74) *Attorney, Agent, or Firm*—Nixon & Vanderhye P.C.

(57) ABSTRACT

A vehicle control apparatus has a control unit for controlling an engine based on an engine control program and a control unit for controlling a transmission based on a transmission control program. The control units share a predetermined control data such as an engine rotation speed as a shared data. Forwarding a data from the control unit which provides the shared data to the control unit which receives the shared data is effected through shared memories provided separately from storage areas in which all the control data to be used by the control units in respective control operations are stored. Even if the system has different configurations, the addresses to be accessed for sharing the control data between the control units are the same so that the same control programs can be used.

9 Claims, 6 Drawing Sheets

| Handle.ID | STORAGE ADDRESS | DATA LENGTH(bit) | OFFSET |
|---|---|---|---|
| 1 (NE) | 8000 | 16 | 0 |
| 2 (FLAG) | 8002 | 1 | 7 |
| 3 (SHIFT POSITION) | 8002 | 2 | 4 |
| 4 (POST-GEAR CHANGE TIME) | 8002 | 4 | 0 |
| 5 (MODE SWITCH) | 8002 | 1 | 6 |
| 6 (SPD) | 8003 | 8 | 0 |
| ⋮ | ⋮ | ⋮ | ⋮ |

VEHICLE CONTROL APPARATUS AND METHOD SHARING CONTROL DATA

CROSS REFERENCE TO RELATED APPLICATION

This application relates to and incorporates herein by reference Japanese Patent Application No. 11-30572 filed on Feb. 8, 1999.

BACKGROUND OF THE INVENTION

1. Field of the Invention

The present invention relates to a vehicle control apparatus and method for controlling a plurality of control objects provided in a vehicle.

2. Related Art

A conventional vehicle control apparatus which controls a plurality of control objects, such as a vehicle engine, a vehicle transmission and the like, has a plurality of electronic control units (ECUs) which control the corresponding control objects based on control programs for the control objects, respectively. The control units share control data to improve control performance.

For instance, a transmission control unit uses to control the transmission a data of engine rotation speed NE calculated in an engine control unit based on the signal of a rotation sensor, or oppositely the engine control unit uses to control the engine a data of a vehicle speed SPD calculated in the transmission control unit based on the rotation speed of a drive shaft or the like.

A variety of system configurations of such a vehicle control apparatus are proposed as shown in FIGS. 10A to 10C. The engine control unit and the transmission control unit are provided and both of the control units share the data of the engine rotation speed NE and the vehicle speed SPD.

In one system, as shown in FIG. 10A, both of an engine control unit A1 and a transmission control unit A2 are integrated into a single microcomputer (CPU) 1 provided in a single electronic control unit (ECU) 50. That is, in the system using the single CPU 1 in the single ECU 50 shown in FIG. 10A, the single CPU 1 provided in the single ECU 50 operates as both of the engine control unit A1 and the transmission control unit A2 by executing both control programs for an engine control and a transmission control.

In this system using the single CPU 1 in the single ECU 50, the engine control unit A1 and the transmission control unit A2 shares the data of the engine rotation speed NE and the vehicle speed SPD through a RAM normally provided in the CPU 1 for storing control data.

More specifically, the engine control unit A1 (that is, when the CPU 1 operates as the engine control unit A1) reads out from a predetermined storage location in the RAM the data of the vehicle speed SPD which has been written by the transmission control unit A2 (that is, written when the CPU 1 operated as the transmission control unit A2). Further, the transmission control unit A2 (that is, when the CPU 1 operates as the transmission control unit A2) reads out from another predetermined storage location in the RAM the data of the engine rotation speed NE which has been written by the engine control unit A1 (that is, written when the CPU 1 operated as the engine control unit A1).

In another system, as shown in FIG. 10B, two CPUs 1 and 2 are provided in a single ECU 60 to realize recently required complicated controls. The engine control unit A1 is integrated in the CPU 1, and the transmission control unit A2 is integrated in the CPU 2. That is, in the system using two CPUs 1 and 2 in the single ECU 60, one CPU 1 operates as the engine control unit A1 by executing the control program for the engine control, and the other CPU 2 operates as the transmission control unit A2 by executing the control program for the transmission control.

In this system of two CPUs 1 and 2 in the single ECU 60, an inter-CPU communication control unit B1 is integrated in the CPU 1 of the engine control unit A1 to transmit the data of the engine rotation speed NE to the CPU 2 of the transmission control unit A2 and to receive the data of the vehicle speed SPD transmitted from the CPU 2. Further, an inter-CPU communication control unit B2 is integrated in the CPU 2 to transmit the data of the vehicle speed SPD to the CPU 1 and to receive the data of the engine rotation speed NE transmitted from the CPU 1.

Furthermore, the engine control unit A1 realized by the CPU 1 reads out for data sharing the data of the vehicle speed SPD transmitted from the CPU 2 and stored in the inter-CPU communication control unit B1 of its own side (specifically, in data-receiving registers or the like which constitutes the inter-CPU communication control unit B1). The transmission control unit A2 realized by the CPU 2 reads out for data sharing the data of the engine rotation speed NE transmitted from the CPU 1 and stored in the inter-CPU communication control unit B2 of its own side (specifically, in data-receiving registers or the like which constitutes the inter-CPU communication control unit B2).

In a further system, as shown in FIG. 10C, the CPU 1 integrated with the engine control unit A1 (for operating as the engine control unit A1) and the CPU 2 integrated with the transmission control unit A2 (for operating as the transmission control unit A2) are provided in two ECUs 70 and 80, respectively. In this dual ECU system configuration, the two ECUs 70 and 80 are connected through a local area network (LAN) provided in the vehicle.

In this dual ECU system, a LAN communication control unit C1 is integrated in the CPU 1 in the ECU 70 constituting the engine control unit A1 to transmit the data of the engine rotation speed NE to the LAN and receive the data of the vehicle speed SPD transmitted from the ECU 80. A LAN communication control unit C2 is integrated in the CPU 2 in the ECU 80 constituting the transmission control unit A2 to transmit the data of the vehicle speed SPD to the LAN and receive the data of the engine rotation speed NE transmitted from the ECU 70.

Furthermore, in this dual ECU system configuration, the engine control unit A1 realized by the CPU 1 reads out for data sharing the data of the vehicle speed SPD transmitted from the ECU 80 and stored in the LAN communication control unit C1 of its own side (specifically, in a data-receiving register or the like constituting the LAN communication control unit C1). The transmission control unit A2 realized by the CPU 2 reads out for data sharing the data of the engine rotation speed NE transmitted from the ECU 70 and stored in the LAN communication control unit C2 of its own side (specifically, in a data-receiving register or the like constituting the LAN communication control unit C2).

As shown in FIGS. 10A to 10C, the vehicle control apparatus of this kind may be configured differently depending on types of vehicles even if the same engine control and transmission control are to be performed. The storage locations of control data to be shared by the control units (shared data) differ depending on the system configurations.

Here, difference in the storage locations of the shared data means that the addresses to be accessed for one control unit to share the control data with another control unit becomes different. As a result, the control programs for the control units must be provided separately for each system configuration. That is, the control program for each control unit has to be changed, because the accessed addresses and access processes for sharing the shared data differ, even if the control logic is not changed. The shared data are not only the engine rotation speed NE and the vehicle speed SPD but also many others such as data of other sensor information or data indicative of gear change condition of the transmission. As a result, the changes to the control programs increase greatly.

SUMMARY OF THE INVENTION

The present invention has an object to enable the same program to be used in different system configurations in a vehicle control apparatus in which a plurality of control units are provided for controlling corresponding control objects based on control programs while sharing control data.

According to the present invention, forwarding of a shared data from one control unit which calculates and provides the shared data to another control unit which receives the shared data is effected through a shared memory provided separately from memory units which store all other control data used to control each control object.

Preferably, the shared data is stored in the same storage location in each control unit. The storage location is defined in a storage information definition table which defines a data length and a storage head address of each shared data. The storage information definition table also defines a bit location in the storage address for a shared data which has a data length less than the number of bits which can be stored in one storage address, so that a plurality of shared data may collectively be stored in one storage address.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

A vehicle control apparatus embodying the present invention will be described in further detail.

Figure 1A:
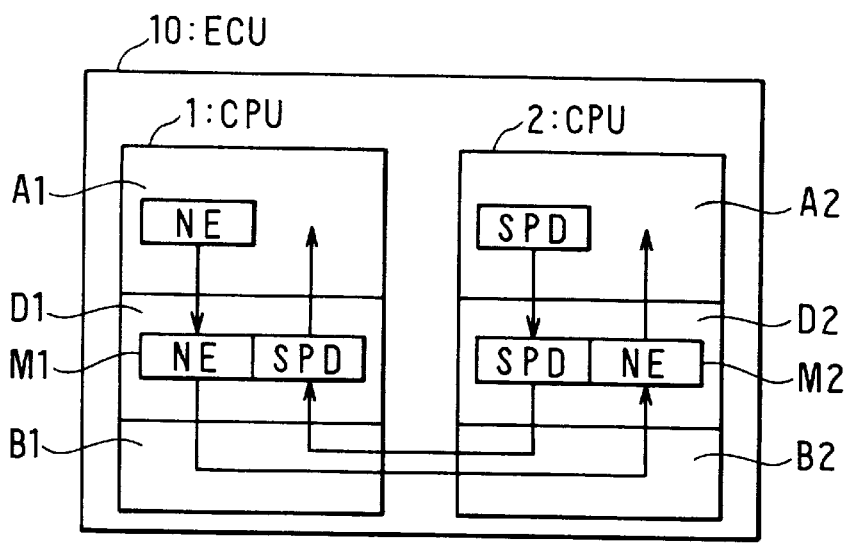
FIGS. 1A to 1C are block diagrams showing a vehicle control apparatus according to embodiments of the present invention.

FIG. 1A is a block diagram showing a vehicle control apparatus according to a first embodiment which controls an internal combustion engine and a transmission mounted in a vehicle. As shown in FIG. 1A, the vehicle control apparatus has a system configuration in which two CPUs 1 and 2 are provided in a single ECU 10.

An engine control unit A1 is integrated in one CPU 1 which controls the engine based on a control program for an engine control, and a transmission control unit A2 is integrated in another CPU 2 which controls the transmission based on a control program for a transmission control.

That is, each CPU 1 and 2 provided in the single ECU 10 has a ROM for storing its own control program and data to be referred to in executing the control program, a RAM for temporarily storing control data calculated in execution of the control program and used in the control, and the like. Of the two CPUs 1 and 2, one CPU 1 operates as the engine control unit A1 by executing the control program for the engine control stored in the ROM of its own side, and the other CPU 2 operates as the transmission control unit A2 by executing the control program for the transmission control stored in the ROM of its own side.

In the vehicle control apparatus according to the first embodiment, the transmission control unit A2 uses for controlling the transmission control data such as an engine rotation speed NE, an engine coolant temperature and the like calculated in the engine control unit A1, and oppositely the engine control unit A1 uses for controlling the engine control data such as a vehicle speed SPD calculated in the transmission control unit A2. Thus, both of the control units A1 and A2 share predetermined control data therebetween to improve control performance.

Shared memory units D1 and D2 and inter-CPU communication control units B1 and B2 are integrated in the CPUs 1 and 2, respectively, to realize sharing of the control data between both control units A1 and A2.

The control programs in the ROMs to be executed by the CPUs 1 and 2 are programmed based on an object-oriented basis in which an object is provided for each unit function by dividing the entire function of the programs into unit functions. Here, the object means a software module which is a combination of data and program which is a data processing process called as "method".

Regarding the software only, the engine control unit A1 is an object for the engine control (engine control method and data) stored in the ROM of the CPU 1. Each of the shared memory unit D1 and the inter-CPU communication control unit B1 integrated in the CPU 1 with the engine control unit A1 also is an object (method and data) stored in the ROM of the CPU 1. Similarly, the transmission control unit A2 is an object for the transmission control (transmission control method and data) stored in the ROM of the CPU 2. Each of the shared memory unit D2 and the inter-CPU communication control unit B2 integrated in the CPU 2 with the transmission control unit A2 also is an object (method and data) stored in the ROM of the CPU 2.

The expression of operation such as "the engine control unit A1 does - - - ." or "the shared memory unit D1 does - - - ." in which the subject word is an object actually means that the functional means realized by CPU's operation attained based on the method of the object (that is, the CPU executes the method of the object) operates to do the operation of "- - - ". Similarly, the passive expression of operation by the object such as "- - - is done by the engine control unit A1." On the other hand, "- - - is done by the shared memory unit D1." actually means that the above operation of "- - -" is attained by the functional means realized by the operation of the CPU operating based on the method of the object.

Here, the shared memory unit D1 of the CPU 1 is an object which writes in the RAM of the CPU 1 the control data (data of the engine rotation speed NE or the like) of the control data calculated in the engine control unit A1 which is to be used in the transmission control unit A2 as well. The writing is into a shared memory M1 set as a specified storage area different from a storage area (control data storage area) for temporarily storing all the control data which the engine control unit A1 uses to control the engine. The shared memory unit D1 also reads out from the shared memory M1 the control data (data of vehicle speed SPD) calculated by the transmission control unit A2 and provides the same to the engine control unit A1.

Similarly, the shared memory unit D2 of the CPU 2 is an object which writes in the RAM of the CPU 2 the control data (data of the vehicle speed SPD or the like) of the control data calculated in the transmission control unit A2 which is to be used in the engine control unit A1 as well. The writing is into a shared memory M2 set as a specified storage area different from a storage area (control data storage area) for temporarily storing all the control data which the transmission control unit A2 uses to control the transmission. The shared memory unit D2 also reads out from the shared memory M2 the control data (data of engine rotation speed NE) calculated by the engine control unit A1 and provides the same to the transmission control unit A2.

Here, the shared memory unit D1 of the CPU 1 and the shared memory unit D2 of the CPU 2 are identical with respect to the software. The memory spaces (addresses) of the two shared memories M1 and M2 are set equally between the CPU 1 and the CPU 2. Further, the RAMs (and also shared memories M1 and M2) of the CPUs 1 and 2 store a one-byte data in each address.

The inter-CPU communication control unit B1 of the CPU 1 is an object which transmits to the CPU 2 the control data written into the shared memory M1 by the shared memory unit D1 and receives the control data transmitted from the CPU 2 to write the same into the shared memory M1.

Similarly, the inter-CPU communication control unit B2 of the CPU 2 is an object which transmits to the CPU 1 the control data written into the shared memory M2 by the shared memory unit D2 and receives the control data transmitted from the CPU 1 to write the same into the shared memory M2.

The inter-CPU communication control unit B1 of the CPU 1 writes the control data of the shared memory M2 transmitted by the inter-CPU communication control unit B2 of the CPU 2 into a storage location of storage locations of the shared memory M1 which is the same as that of the shared memory M2 for the control data.

The inter-CPU communication control unit B2 of the CPU 2 writes the control data of the shared memory M1 transmitted by the inter-CPU communication control unit B1 of the CPU 1 into a storage location of storage locations of the shared memory M2 which is the same as that of the shared memory M1 for the control data.

That is, by the two inter-CPU communication control units B1 and B2, the shared data written into the shared memory of one control unit between the engine control unit A1 and the transmission control unit A2 which calculates and provides the shared data (that is, control data to be shared by the engine control unit A1 and the transmission control unit A2) is forwarded to the shared memory of the other control unit which receives the shared data, particularly to the address which is the same as that of the shared memory of the control unit which provides the shared data.

Figures 2, 3:
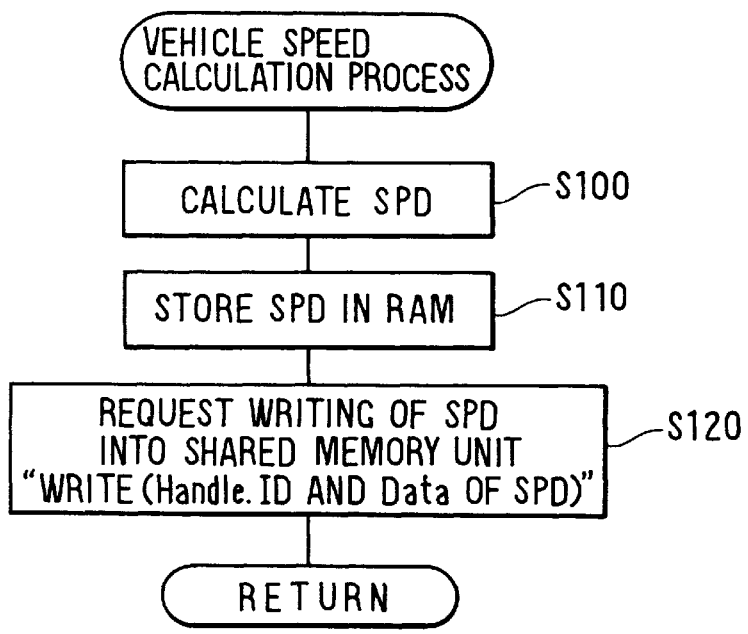
FIG. 2 is a diagram showing a storage location definition table used in the embodiments.
FIG. 3 is a flow diagram showing a vehicle speed calculation process of a transmission control unit.

Further, as shown in FIG. 2, each ROM in the CPUs 1 and 2 stores at a predetermined storage area a storage location definition table in which an identification code (Handle.ID) indicative of the types of the shared data, storage location as storage information indicative of storage location in the shared memories M1 and M2, data length and offset of the shared data indicated by Handle.ID.

In the storage location definition table, the data length indicates the data length of the shared data indicated by the Handle.ID (that is, the shared data stored in the shared memories M1 and M2), and the storage address indicates addresses (indicated in hexadecimal number) of the shared memories M1 and M2 which store the shared data indicated by Handle.ID. The offset indicates from which bit position the shared data indicated by the Handle.ID is to be stored in upper bit side, and indicates a storage bit position counted from the lowest bit position defined as 0-th bit.

Here, in the storage location definition table, the offset is always set to 0 (refer to columns in which the Handle.ID is 1 or 6) with respect to the shared data having the data length in byte units such as 1 byte, 2 bytes, and the like. As a result, the storage address indicates the storage head address in the shared memories M1 and M2 for the shared data with respect to the shared data in byte units.

The shared memory units D1 and D2 specify, in response to requests of writing and reading the shared data of the engine control unit A1 or the transmission control unit A2, the storage location in the shared memories of the shared data indicated by the Handle.ID included in the requests from the storage location definition table. Then the shared memory units D1 and D2 writes the corresponding shared data into the specified position, and reads out the corresponding shared data from the specified storage location.

Next, processing executed by the CPUs 1 and 2 is described with reference to cases in which the data SPD of the vehicle speed SPD calculated in the transmission control unit A2 is used in the engine control unit A1 to check an idling condition of the engine, and in which the data indicating a shift position of the transmission (gear positions such as first speed to fourth speed) detected in the transmission control unit A2 is used in the engine control unit A1 to set a target idling rotation speed of the engine.

First, as shown in FIG. 3, in a vehicle speed calculation process of the transmission control unit A2 executed periodically by the CPU 2, the vehicle speed SPD is calculated from a signal from the vehicle speed sensor at the first step (S) 100. At the following S110, the data of the calculated vehicle speed SPD (8 bits in the present embodiment) is stored at S110 in the control data storage area of the RAM provided in the CPU 2.

At the following step S120, writing of the vehicle speed SPD into the shared memory unit is requested to also write (copy) the data of the calculated vehicle speed SPD into the shared memory unit D2. The vehicle speed calculation process ends thereafter.

Here, the writing request of the vehicle speed SPD uses as an argument the Handle.ID of the vehicle speed SPD and the data (Data) of the vehicle speed SPD calculated at S100. In the case that this process is programmed in C language, the instruction to request the writing of vehicle speed is written as "Write (Handle.ID of vehicle speed SPD, data).

This instruction means that the Data (data of vehicle speed SPD in this instance) is written into a storage location corresponding to the Handle.ID of the vehicle speed SPD. In the case that a shared data other than the vehicle speed SPD is to be written in the shared memory, the Handle.ID and Data of the argument in the above instruction become a Handle.ID which indicates the type of data to be written and a data to be written, respectively.

Figure 4:
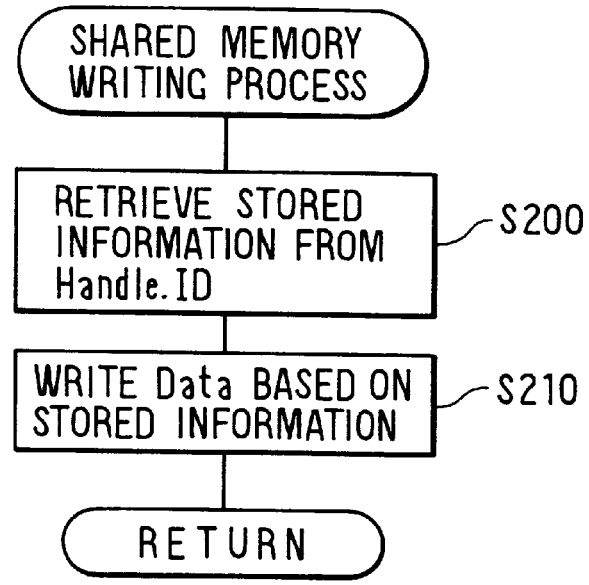
FIG. 4 is a flow diagram showing a process of writing into a shared memory.

When the writing into the shared memory is thus requested by the transmission control unit A2 (S120), the CPU 2 executes a writing process of processes of the shared memory unit D2 shown in FIG. 4.

In this writing process, at S200, a storage information comprising the storage address, data length and offset corresponding to the Handle.ID which is one of the argument of the writing request is retrieved from the storage location definition table shown in FIG. 2. At the following S210, the Data which is the other of the argument of the writing request is written into the shared memory M2 based on the storage information retrieved at S200. The writing process is thus ended thereafter.

In this instance, as shown in FIG. 2, the storage address, data length and offset of the storage information corresponding to the Handle.ID (=6) of the vehicle speed SPD are 8003, 8 bits (1 byte) and 0, respectively. Therefore, the 8-bit data of the vehicle speed SPD calculated in the transmission control unit A2 is written into the address 8003 of the shared memory M2.

The data of vehicle speed SPD thus written into the address 8003 of the shared memory M2 of the CPU 2 is also written into the same address 8003 of the shared memory M1 of the CPU 1 by the inter-CPU communication units B1 and B2 integrated in the CPUs 1 and 2.

The writing process of FIG. 4 is also executed in the CPU 1 as one of the processes of the shared memory unit D1. That is, the process is executed when the shared data calculated in the engine control unit A1 is written into the shared memory M1.

For instance, the engine rotation speed NE is calculated from a signal of the rotation sensor by the engine control unit A1 in the CPU 1. The writing process of FIG. 4 is executed by the engine control unit A1 when the engine control unit A1 requests a writing of the engine rotation speed NE into the shared memory unit in the similar manner as S120 of FIG. 3. In this instance, as shown in FIG. 2, the storage address, data length and offset as the storage information corresponding to the Handle.ID (=1) of the engine rotation speed NE are 8000, 16 bits (2 bytes) and 0, respectively. Therefore, the 16-bit data of the engine rotation speed NE calculated by the engine control unit A1 is written into addresses of the shared memory M1 starting from 8000 as a head address. That is, the 16-bit data of the engine rotation speed NE is written into addresses 8000 and 8001 of the shared memory M1. The data of the engine rotation speed NE thus written into the addresses 8000 and 8001 of the shared memory M1 of the CPU 1 is also written into the same addresses 8000 and 8001 of the shared memory M2 of the CPU 2 by the inter-CPU communication control units B1 and B2 integrated in the CPUs 1 and 2.

Figure 5:
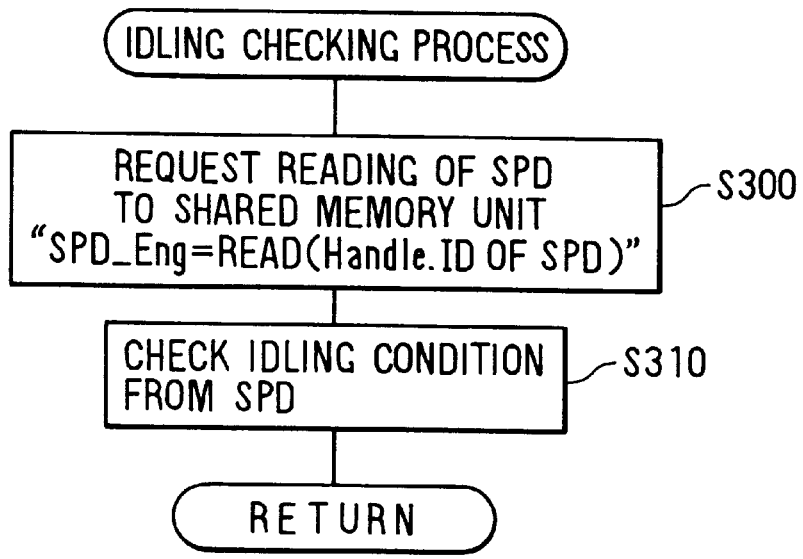
FIG. 5 is a flow diagram showing an idling checking process of an engine control unit.

On the other hand, as shown in FIG. 5, in an idling checking process of the engine control unit A1 executed periodically in the CPU 1, a reading of the vehicle speed SPD is requested to the shared memory unit to read out the data of the vehicle speed SPD calculated by the transmission control unit A2 from the shared memory M1.

Here, the reading request of the vehicle speed SPD uses as an argument the Handle.ID of the vehicle speed SPD. In the case that this process is programmed in C language, the instruction to request the reading of vehicle speed SPD is written as "SPD_Eng =read (Handle.ID of vehicle speed SPD).

This instruction means that the data corresponding to the Handle.ID of the vehicle speed SPD is to be read out and to be stored in a storage location SPD_Eng set to store the vehicle speed SPD among the control data storage areas of the RAM. In the case that a shared data other than the vehicle speed SPD is to be read out from the shared memory, the Handle.ID and SPD_Eng in the above instruction become a Handle.ID which indicates the type of data to be read out and a storage area among the control data storage areas of the RAM in which the data to be read out is stored, respectively.

Figure 6:
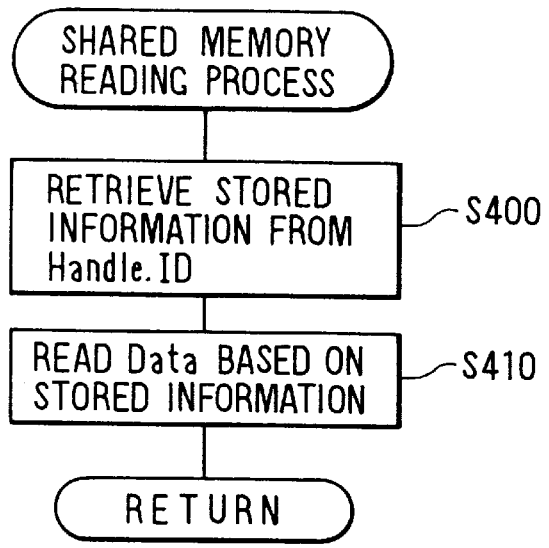
FIG. 6 is a flow diagram showing a process of reading from the shared memory.

When the reading is thus requested from the engine control unit A1 to the shared memory (S300), the CPU 1 executes a reading process of processes of the shared memory unit D1 shown in FIG. 6.

In this reading process, at S400, a storage information comprising the storage address, data length and offset corresponding to the Handle.ID which is the argument of the reading request is retrieved from the storage location definition table shown in FIG. 2. At the following S410, based on the storage information retrieved at S400, the data is read out from the shared memory M1 and is written into the storage area SPD_Eng as a returned value. The reading process thus ends thereafter.

In this instance, as shown in FIG. 2, the storage address, data length and offset of the storage information corresponding to the Handle.ID (=6) of the vehicle speed SPD are 8003, 8 bits (1 byte) and 0, respectively. Therefore, the 8-bit data of the vehicle speed SPD calculated in the transmission control unit A2 is read out from the address 8003 of the shared memory M1 and stored in the storage area SPG_Eng.

When the data of the vehicle speed SPD is thus read out from the shared memory M1, the execution of process returns to the idling checking process shown in FIG. 5. The engine idling condition is checked at S310 using the data of the vehicle speed SPD stored in the storage area SPG_Eng, a throttle position (opening angle position of a throttle valve of the engine) calculated in the other process of the engine control unit A1 and the like. The idling checking process ends thereafter.

The reading process of FIG. 6 is also executed in the CPU 2 as one of the processes of the shared memory unit D2. That is, the process is executed when the shared data calculated in the engine control unit A1 is read out from the shared memory M2.

For instance, when the reading of engine rotation speed NE is requested to the shared memory from the transmission control unit A2 in the similar manner as S300 in FIG. 5, the reading process of FIG. 6 is executed by the transmission control unit A2. In this instance, as shown in FIG. 2, the storage address, data length and offset as the storage information corresponding to the Handle.ID (=1) of the engine rotation speed NE are 8000, 16 bits (2 bytes) and 0, respectively. Therefore, the 2-byte data stored in the addresses 8000 and 8001 of the shared memory M2 are read out as the data of the engine rotation speed NE calculated in the engine control unit A1 and is used for the transmission control.

As described above, the control data such as the vehicle speed SPD and the engine rotation speed NE in byte units are shared between the engine control unit A1 of the CPU 1 and the transmission control unit A2 of the CPU 2.

Figure 7:
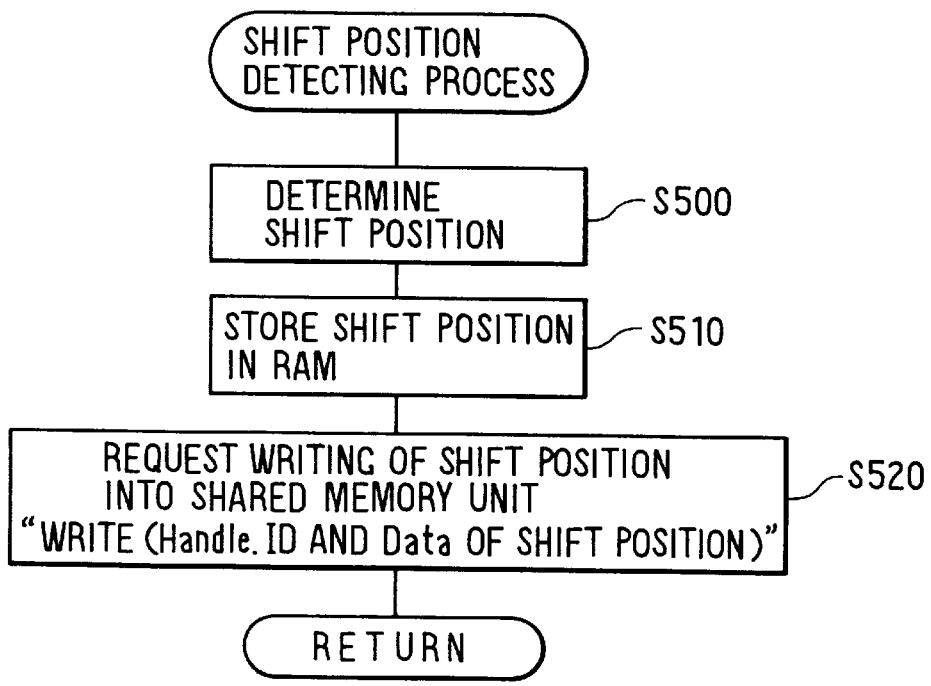
FIG. 7 is a flow diagram showing a shift position detecting process of the transmission control unit.

In a shift position detecting process of the transmission control unit A2 executed periodically in the CPU 2, as shown in FIG. 7, the present shift position of the transmission is checked from control condition of the transmission at S500.

The data (2 bits in the present embodiment) indicative of the checked shift position is stored in the control data storage area of the RAM provided in the CPU 2 at S510 to use it in the transmission control.

The writing of the shift position into the shared memory is requested at S520 to also write (copy) the data of the checked shift position. The shift position detecting process ends thereafter.

The instruction to request the writing of the shift position at S520 is written as "Write (Handle.ID of shift position, Data)" in the same manner as the writing request of the vehicle speed SPD.

This instruction means that the Data (data of shift position in this instance) corresponding to the Handle.ID of the shift position is to be written.

When the writing is thus requested from the transmission control unit A2 to the shared memory (S520), the CPU 2 executes the writing process of processes of the shared memory unit D2 as shown in FIG. 4.

In this writing process, a storage information comprising the storage address, data length and offset corresponding to the Handle.ID (=3) is 8002, 2 bits and 4 as shown in FIG. 2. Therefore, the 2-bit data of the shift position determined by the transmission control unit A2 is written into the address 8002 of the shared memory M2 as shown by (e) in FIG. 9. The data is written in the fourth bit and the fifth bit counted from the lowest bit as 0-th bit in the address 8002.

The data of the shift position thus written into the fourth and fifth bits of the address 8002 of the shared memory M2 are also written into the same fourth and fifth bits of the address 8002 of the shared memory M1 of the CPU 1 by the inter-CPU communication control units B1 and B2 integrated in the CPUs 1 and 2.

Figure 8:
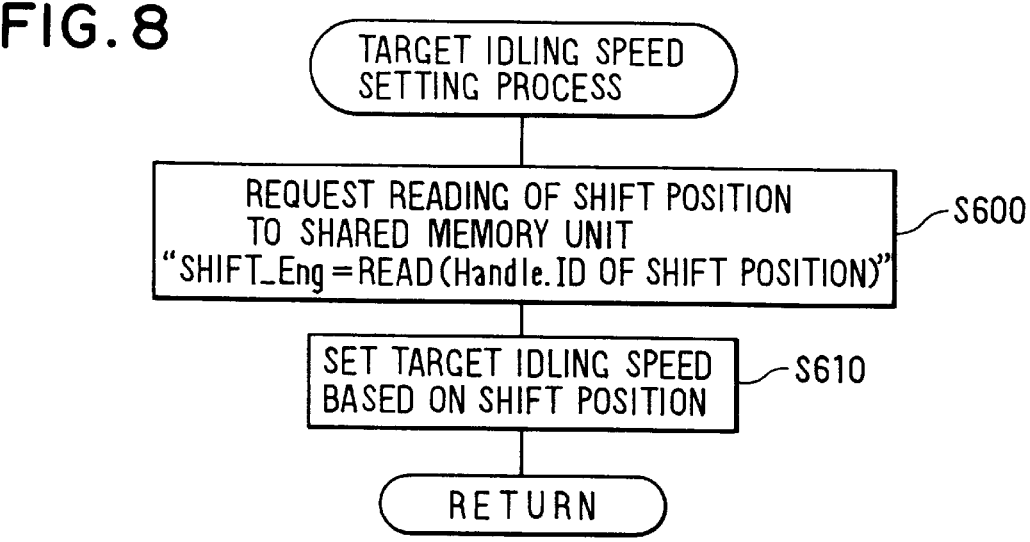
FIG. 8 is a flow diagram showing a target idling rotation speed setting process of the engine control unit.

On the other hand, as shown in FIG. 8, in a target idling rotation speed setting process of the engine control unit A1 executed periodically in the CPU 1, a reading of the shift position is requested to the shared memory unit to read out the data of the shift position determined by the transmission control unit A2 from the shared memory M1.

Here, in the case that this process is programmed in C language, the instruction to request the reading of shift position at S600 is written as "SHIFT_Eng =read (Handle.ID of shift position).

This instruction means that the data corresponding to the Handle.ID of the shift position is to be read out and to be stored in a storage location SHIFT_Eng set to store the shift position among the control data storage areas of the RAM.

When the reading is thus requested from the engine control unit A1 to the shared memory (S600), the CPU 1 executes the reading process of processes of the shared memory unit D1 shown in FIG. 6.

In this instance, as shown in FIG. 2, the storage address, data length and offset of the storage information corresponding to the Handle.ID (=3) of the shift position are 8002, 2 bits and 4, respectively. Therefore, the 2-bit data of the shift position determined by the transmission control unit A2 is read out from the fourth and fifth bits of the address 8002 of the shared memory M1 and stored in the storage area SHIFT_Eng.

When the data of the shift position is thus read out from the shared memory M1 in the reading process of FIG. 6, the execution of process returns to the target idling rotation speed setting process shown in FIG. 8. The target idling rotation speed of the engine is set at S610 using the data of the shift position stored in the storage area SHIFT_Eng, an air conditioner operation condition detected in the other process and the like. The target idling rotation speed setting process ends thereafter.

As described above, the 2-bit data of the shift position which is less than 1 byte is shared between the engine control unit A1 of the CPU 1 and the transmission control unit A2 of the CPU 2. In the present embodiment, however, the transmission control unit A2 is programmed to also detect a condition of a mode switch (power mode, economy mode, over-drive cut-off, and the like) which a vehicle driver operates to set a gear change pattern of the transmission as well as post gear-change period which indicates an elapse of time from the change in gear positions of the transmission. The data of the mode switch condition (1 bit data in the present embodiment), the data of the post gear-change period (4 bits in the present embodiment) and data of a flag indicative of other control condition of the transmission (1 bit in the present embodiment) are provided from the transmission control unit A2 to the engine control unit A1.

For instance, when the 1-bit data of the flag determined in the transmission control unit A2 and used in the engine control unit A1 is to be written into the shared memory M2 of the CPU 2, the transmission control unit A2 requests a writing of the flag (writing request using the Handle.ID of the flag as the argument) into the shared memory, so that the writing process of FIG. 4 may be executed. In this instance, as shown in FIG. 2, the storage address, data length and offset of the storage information corresponding to the Handle.ID (=2) of the flag are 8002, 1 bit and 7, respectively. Therefore, the 1-bit data of the flag is written into the seventh bit counted from the lowest bit as 0-th bit in the address 8002 of the shared memory M2 as shown by (e) in FIG. 9.

Similarly, when the 4-bit data of the post gear-change period determined in the transmission control unit A2 and used in the engine control unit A1 is to be written into the shared memory M2 of the CPU 2, the transmission control unit A2 requests a writing of the post gear-change period (writing request using the Handle.ID of the post gear-change period as the argument) into the shared memory, so that the writing process of FIG. 4 may be executed. In this instance, as shown in FIG. 2, the storage address, data length and offset of the storage information corresponding to the Handle.ID (=4) of the post gear-change period are 8002, 4 bits and 0, respectively. Therefore, the 4-bit data of the post gear-change period is written into the 0-th bit to the third bit counted from the lowest bit as 0-th bit in the address 8002 of the shared memory M2 as shown by (e) in FIG. 9.

Further, when the 1-bit data of the mode switch determined in the transmission control unit A2 and used in the engine control unit A1 is to be written into the shared memory M2 of the CPU 2, the transmission control unit A2 requests a writing of the mode switch (writing request using the Handle.ID of the mode switch as the argument) into the shared memory, so that the writing process of FIG. 4 maybe executed. In this instance, as shown in FIG. 2, the storage address, data length and offset of the storage information corresponding to the Handle.ID (=5) of the mode switch are 8002, 1 bit and 6, respectively. Therefore, the 1-bit data of the mode switch is written into the sixth bit counted from the lowest bit as 0-th bit in the address 8002 of the shared memory M2 as shown by (e) in FIG. 9.

Figure 9:
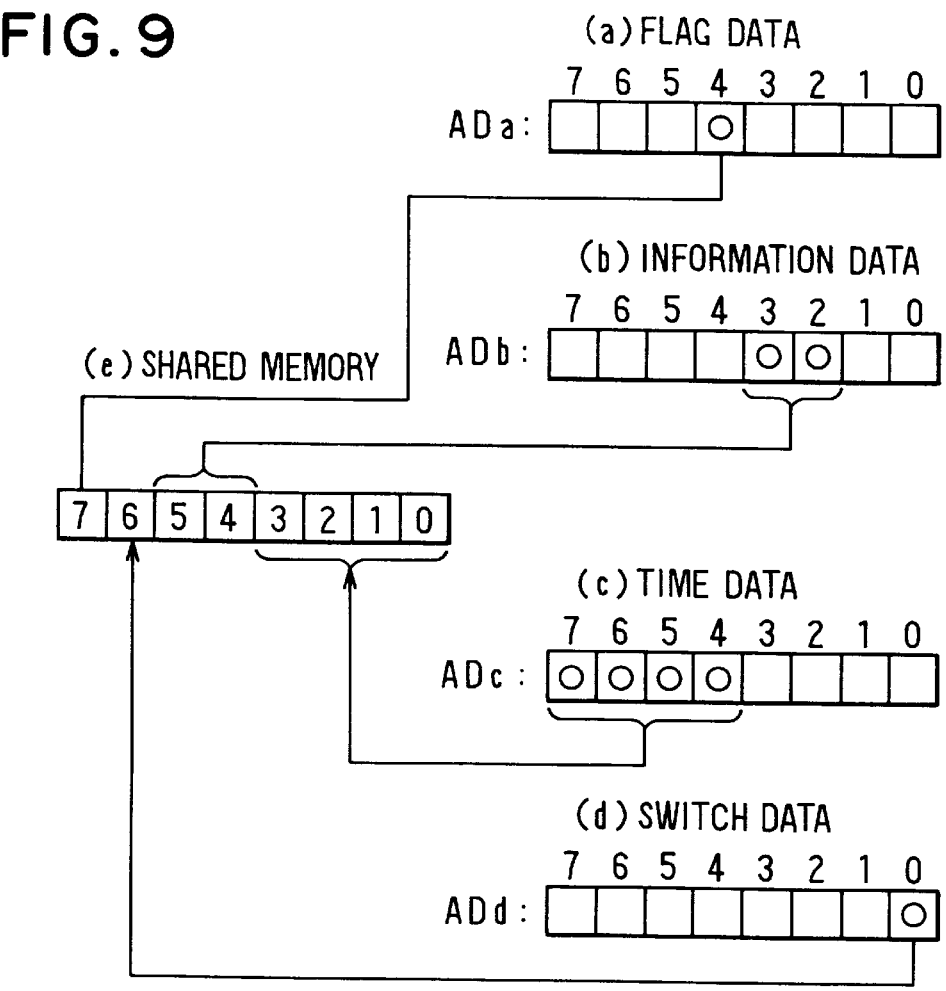
FIG. 9 is a diagram showing writing of shared data of less than 1 byte into the shared memory.
Figure 10A:
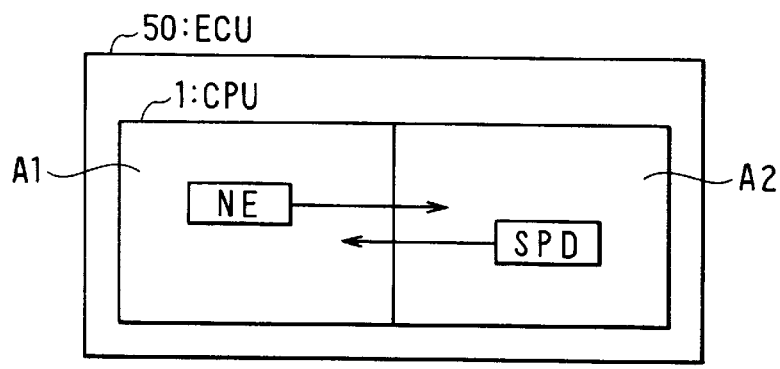
FIGS. 10A to 10C are block diagrams showing conventional vehicle control apparatus.
Figure 10B:
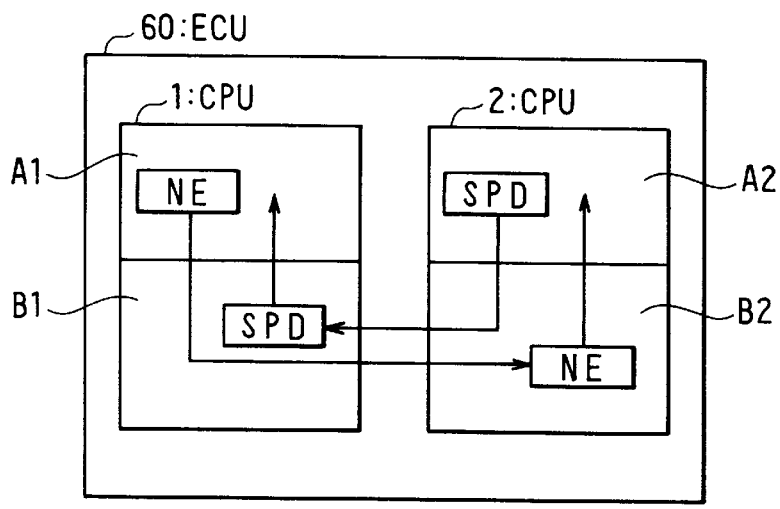
Figure 10C:
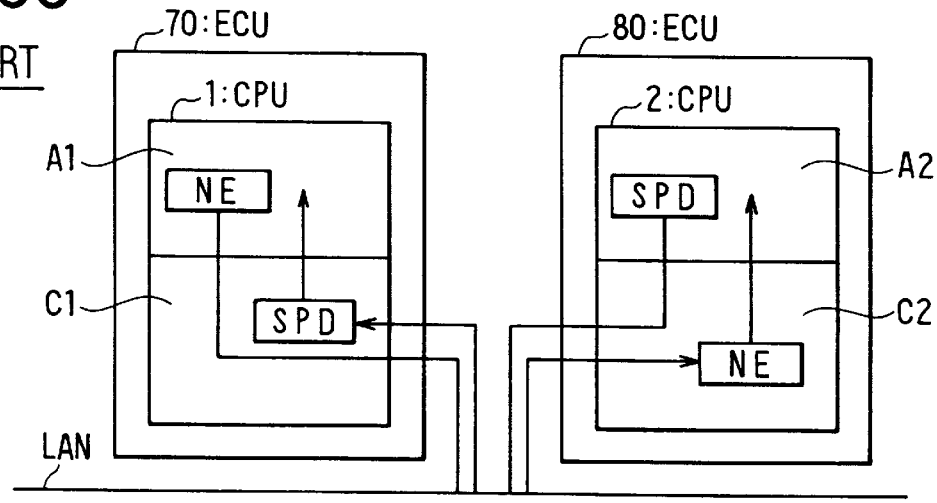

That is, as understood from (e) of FIG. 9, each of the shared data in bit units such as the data of shift position, the data of flag, the data of post gear-shift period and the data of mode switch which is less than 1 byte is stored as a part of one address of the shared memory M2 (both memories M1 and M2 in the end). The timing of writing each of the shared data in bit units need not be the same. Each of the shared data may be written at appropriate timing in the corresponding process.

This writing is based on the following reasons.

In the vehicle control of this kind, generally, various data are stored in the control data storage areas of the RAM by dividing into data types such as data of flags, data of switches, data of time indicated by count of time, data of other information and the like.

For instance, in the CPU 2 in which the transmission control unit A2 is integrated, a plurality of flag data less than 1 byte are collectively stored in a certain address ADa in the control data storage area in the RAM as shown by (a) in FIG. 9, and a plurality of information data less than 1 byte are collectively stored in a certain address ADb in the control data storage area in the RAM as shown by (b) in FIG. 9. Similarly, as shown by (c) in FIG. 9, a plurality of time data less than 1 byte is collectively stored in a certain address ADc in the control data storage area in the RAM. Further, as shown by (d) in FIG. 9, a plurality of switch data less than 1 byte is stored in a certain address ADd in the control data storage area in the RAM.

That is, generally, each data in bit units less than 1 byte is not classified, collected nor stored in the control data storage area in the RAM based on whether it is a data to be used only in the transmission control unit A2 or a data to be used commonly (shared) with other control units such as the engine control unit A1.

This is for the reason that the calculation speed is improved by enabling a plurality of same types of data in less than 1 byte to be processed (for instance, resetting collectively) in units of 1 byte.

In FIG. 9, (a) shows that flag data which are to be used only in the transmission control unit A2 are stored in the 0th to third bits and in the fifth to seventh bits in the flag data storage address ADa in the control data storage area of the RAM, and a flag data which is to be shared with the engine control unit A1 is stored in the fourth bit of the same. Further, (b) shows that information data which are to be used only in the transmission control unit A2 are stored in the 0th and first bits and in the fourth to seventh bits in the information data storage address ADb in the control data storage area of the RAM, and an information data (specifically the above shift position data) which is to be shared with the engine control unit A1 is stored in the second and third bits of the same. Further, (c) shows that time data which is to be used only in the transmission control unit A2 is stored in the 0-th to third bits in the time data storage address ADc in the control data storage area of the RAM, and a time data (specifically the above post gear-change period data) which is to be shared with the engine control unit A1 is stored in the fourth to seventh bits of the same. Still further, (d) in FIG. 9 shows switch data which are to be used only in the transmission control unit A2 are stored in the first to seventh bits in the switch data storage address ADd in the in the control data storage area of the RAM, and a switch data (specifically the above mode switch data) which is to be shared with the engine control unit A1 is stored in the 0-th bit of the same.

If the flag data and the information data in the control data storage area of the RAM which the transmission control unit A2 uses in its control operation is configured to be stored in the shared memory M2 (shared memories M1 and M2 in the end) as shown in the memory arrangement of (a) to (d) in FIG. 9, the shared memories M1 and M2 come to include therein unnecessary data (in this instance, data to be used only in the transmission control unit A2) other than the shared data. As a result, the storage capacity of the shared memories M1 and M2 must be set to be large enough.

In this embodiment, therefore, with regard to the shared data which has the data length less than 1 byte which each of the shared memories M1 and M2 is capable of storing in one address, the storage address and the storage bit position (offset and data length) in the storage address are defined by the storage location definition table. Thus, as shown by (e) of FIG. 9, each shared data in bit units which is less than 1 byte is rearranged and collectively stored in one address of each shared memories M1 and M2.

As a result, a plurality of types of shared data in bit units can be collectively stored in one address of the shared memories M1 and M2 in an arbitrary and efficient manner, so that the storage capacity required to the shared memories M1 and M2 can be reduced. This is of particular advantage in this kind of vehicle control apparatus, because the storage capacity of a memory is limited.

As described above in detail, the vehicle control apparatus according to the first embodiment has a dual CPU system in which the CPU 1 into which the engine control unit A1 is integrated and the CPU 2 into which the transmission control unit A2 is integrated are provided in one ECU 10. Between the engine control unit A1 and the transmission control unit A2, the forwarding of the shared data from one control unit to the other control unit is performed through the shared memories M1 and M2 provided separately from the control data storage areas in the RAMs which store therein all the control data which the control units A1 and A2 use in controlling respective control objects.

Figure 1B:
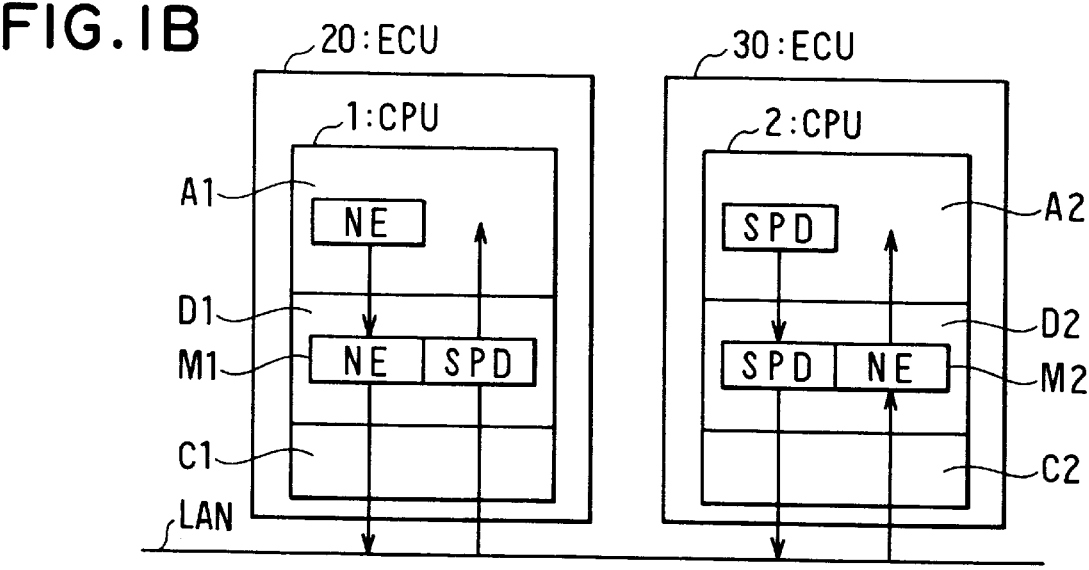
Figure 1C:
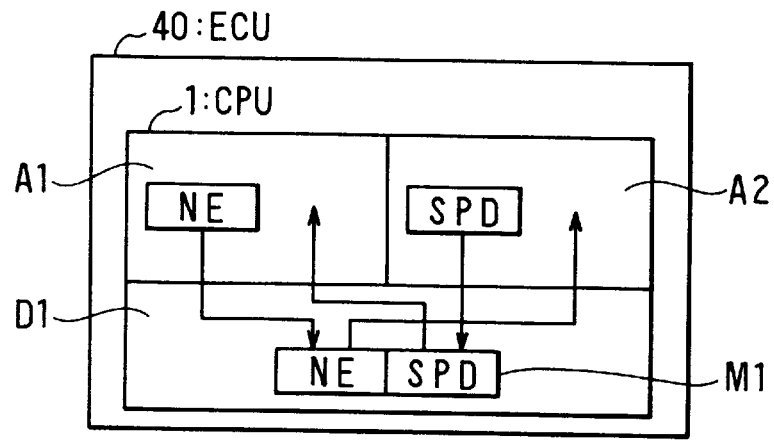

Therefore, as shown in FIG. 1B, the CPU 1 integrating the engine control unit A1 therein may be provided in one ECU 20, and the CPU 2 integrating the transmission control unit A2 therein may be provided in the other ECU 30. In this instance, the CPU 2 integrating the transmission control unit A2 is provided in the other ECU 30 so that the system may be modified to the dual ECU type in which the ECUs 20 and 30 are connected to be capable of communication through a LAN in a vehicle. Alternatively, as shown in FIG. 1C, the engine control unit A1 and the transmission control unit A2 may be integrated into one CPU 1 provided in one ECU 40 so that the system is modified to one ECU and one CPU type. In either system, the control data to be shared (shared data) between the engine control unit A1 and the transmission control unit A2 are stored in the same storage locations. As a result, the address to be accessed by the control units A1 and A2 to share the control data can be made the same irrespective of system configuration.

Therefore, the control programs (control program for engine control and control program for transmission control) need not be provided separately from one system to another, as long as the engine control and the transmission control are the same. Further, even if the system is configured differently, the same control programs can be used. That is, the same control programs can be used in different system configurations, so that the time and cost required for development of the control apparatus can be reduced greatly.

Specifically, in the case that the first embodiment shown in FIG. 1A is to be modified to a dual ECU system configuration, LAN communication control units C1 and C2 which perform data communication through LAN are integrated in the CPU 1 of the ECU 20 and the CPU 2 of the ECU 30 in place of the inter-CPU communication units B1 and B2 as shown in FIG. 1B. The LAN communication control unit C1 of the CPU 1 writes the control data of the shared memory M2 transmitted to the LAN by the LAN communication control unit C2 of the CPU 2 into the same storage location in the storage area of the shared memory 1 as that of the shared memory M2 in which the control data is stored. Further, the LAN communication control unit C2 of the CPU 2 writes the control data of the shared memory M1 transmitted to the LAN by the LAN communication control unit C1 of the CPU 1 into the same storage location in the storage area of the shared memory 2 as that of the shared memory M1 in which the control data is stored.

In the case that the first embodiment shown in FIG. 1A is to be modified to one ECU and one CPU system configuration, the engine control unit A1, the transmission control unit A2 and a shared memory unit D1 may be integrated in one CPU 1 provided in an ECU 40 as shown in FIG. 1C. That is, in this instance, the transmission control unit A2 is integrated into the CPU 1 of FIG. 1A, and instead the inter-CPU communication control unit B1 is eliminated. Thus, the engine control unit A1 and the transmission control unit A2 access one shared memory M1 in the process of the shared memory unit D1 shown in FIGS. 4 and 6.

As described above, whether the system is modified to the dual ECU configuration or one ECU and one CPU configuration, the address and method of access for sharing the control data between the engine control unit A1 and the transmission control unit A2 can be made the same, and the control programs need not be changed at all.

On the other hand, if the dual ECU system shown in FIG. 1B is used as a second embodiment of the vehicle control apparatus, it is only necessary to modify the system in reverse to the above modification so that it may be modified to the one ECU and dual CPU system shown in FIG. 1A. Further, it can be modified to the one ECU and one CPU system shown in FIG. 1C. That is, similarly to the first embodiment, the control programs need not be changed even if the system is configured into a different type.

Similarly, if the one ECU and one CPU system shown in FIG. 1C is used as a third embodiment, it is only necessary to modify the system in reverse to the above modification So that it may be modified to the one ECU and dual CPU system shown in FIG. 1A as understood from comparison of FIGS. 1C and 1A. By the similar modification, it can be changed to the dual ECU system shown in FIG. 1B. That is, similarly to the first embodiment and the second embodiment, the control programs need not be changed even if the system is configured into a different type.

Further, in the above embodiments, both the engine control unit A1 and the transmission control unit A2 request writing or reading to the shared memory units. The shared memory units D1 ad D2 specify from the storage location definition table the storage locations in the shared memories M1 and M2 of the shared data indicated by the Handle.ID included in the request. The corresponding shared data is written into the specified storage location, and the corresponding shared data is read out from the specified storage location.

Therefore, even in the case that the storage location of any shared data in the shared memories M1 and M2 is to be changed, such a change can be effected by only changing the storage information stored in the storage location definition table.

For instance, if the storage address of the data of the engine rotation speed NE is to be changed from 8000 to 6000 for some reason, the programs of the engine control unit A1 and the transmission control unit A2 need not be changed because the Handle.ID of the engine rotation speed NE is not changed from 1. It is only necessary to change the storage address corresponding to Handle.ID =1 from 8000 to 6000 in the storage location definition table shown in FIG. 2.

Further, in the above embodiments, the data length of the shared data is defined as one of storage information in the storage location definition table. Even if the data length of any shared data is to be changed in connection with the communication protocol, communication speed or the like between the CPUs 1 and 2 and between the ECUs 20 and 30, it is only necessary to change the data length of the storage information stored in the storage location definition table.

For instance, if the data length of the vehicle speed SPD is to be changed from 8 bits to 16 bits, the programs of the engine control unit A1 and the transmission control unit A2 need not be changed because the Handle.ID is not changed from 6. It is only necessary to change the data length corresponding to Handle.ID =6 from 8 to 16 in the storage location definition table shown in FIG. 2.

Still further, in the above embodiments, if the type or number of the shared data is to be changed in response to changes in the specification or destination, the information about which data is stored in which location is defined in the storage location definition table shown in FIG. 2. Therefore, it is only necessary to change information in the storage location definition table so that the shared data may be stored with high memory efficiency (that is, without causing vacant area in the shared memory).

Although the present invention has been described with reference to its embodiments, it is not limited to the above embodiments but may be implemented in various ways. For instance, the present invention may be applied in the similar manner to various vehicle control apparatuses for controlling other control objects.

What is claimed is:

1. A vehicle control apparatus comprising:
   first control means for controlling a first control object provided in a vehicle based on a first control program;
   second control means for controlling a second control object provided in the vehicle based on a second control program, the second control means using a predetermined control data calculated by the first control means to control its control object as a shared data shared by both of the control means;
   a shared memory provided separately from memory means which stores all control data used to control each control object of each of the control means; and
   storage information memory means which stores storage information;
   wherein forwarding of the shared data from the first control means which calculates and provides the shared data to the second control means which receives the shared data is effected though the shared memory;
   wherein each of the control means has writing means for writing the shared data into a predetermined storage location of the shared memory;
   wherein the storage information memory means which stores the storage information in correlation with a type of the shared data, and the storage information indicates the storage location of the shared data in the shared memory; and
   wherein the writing means specifies the storage location of the shared data which is to be written into the shared memory based on the storage information stored in the storage information memory means and writes the shared data into the specified storage location.

2. A vehicle control method comprising the steps of:

calculating a first data for use in a first control unit for controlling a first control object provided in a vehicle based on a first control program;

storing the first data in a first memory provided for the first control unit;

calculating a second data for use in a second control unit for controlling a second control object provided in the vehicle based on a second control program;

storing the second data in a second memory provided for the second control unit;

forwarding the first data from the first memory to the second memory to be used in the second control unit for controlling the second control object; and forwarding the second data from the second memory to the first memory to be used in the first control unit for controlling the first control object, wherein the first data is stored in same first addresses between the first memory and the second memory, and the second data is stored in same second addresses between the first memory and the second memory.

3. A vehicle control method of claim 2, wherein:

each of the first data and the second data has a data length less than a predetermined data length of each address of the first memory and the second memory; and the first data and the second data are stored in the first memory and the second memory along with another data which has a data length less than the predetermined data length.

4. A vehicle control method of claim 3, wherein:

addresses and bit positions of the first memory and the second memory for data storing are defined in a storage information definition table with respect to each type of data.

5. A vehicle control apparatus comprising:

first control means for controlling a first control object provided in a vehicle based on a first control program;

second control means for controlling a second control object provided in the vehicle based on a second control program, the second control means using a predetermined control data calculated by the first control means to control its control object as a shared data shared by both of the control means; and a shared memory provided separately from memory means which stores all control data used to control each control object of each of the control means; and wherein forwarding of the shared data from the first control means which calculates and provides the shared data to the second control means which receives the shared data is effected through the shared memory;

the first control means and the second control means has microcomputers, respectively;

the shared memory has two memories which have the same address spaces provided in the first control means and the second control means;

each of the control means has writing means for writing the shared data into a predetermined storage location of the shared memory;

each of the control means has reading means for reading out the shared data from the predetermined storage location in the shared memory; and forwarding means is provided to forward the shared data written by the writing means into the shared memory of each control means to a predetermined storage location of the shared memory of each control means, the storage location of each control means being the same.

6. A vehicle control apparatus comprising:

first control means for controlling a first control object provided in a vehicle based on a first control program;

second control means for controlling a second control object provided in the vehicle based on a second control program, the second control means using a predetermined control data calculated by the first control means to control its control object as a shared data shared by both of the control means; and a shared memory provided separately from memory means which stores all control data used to control each control object of each of the control means; and wherein forwarding of the shared data from the first control means which calculates and provides the shared data to the second control means which receives the shared data is effected through the shared memory;

the first control means and the second control means are constructed with a single microcomputer;

the shared memory is constructed with a single memory shared by the first control means and the second control means;

each control means has writing means for writing the shared data in a predetermined storage location in the shared memory; and each control has reading means for reading out the shared data from the storage location in the shared memory.

7. A vehicle control apparatus of claim 5, wherein:

each control means has storage information memory means which stores in correlated manner a type of the shared data and storage information indicative of the storage location of the shared data in the shared memory;

the writing means specifies the storage location of the shared data which is to be written into the shared memory based on the storage information stored in the storage information memory means and writes the shared data into the specified storage location; and the reading means specifies the storage location of the shared data in the shared memory to be read out from the shared memory based on the storage information stored in the storage information memory means and reads out the shared data from the specified storage location.

8. A vehicle control apparatus of claim 7, wherein:

the storage information memory means stores as the storage information a data length of the shared data and a storage head address in the shared memory.

9. A vehicle control apparatus of claim 7, wherein:

the storage information memory means stores, as the storage information of a shared data having a data length shorter than the number of bits which can be stored in each address of the shared memory, the storage address of the shared data in the shared memory and a storage bit position in the storage address.

* * * * *